United States Patent [19]

Hilton

[11] 4,284,443
[45] Aug. 18, 1981

[54] SINGLE STAGE HOT BONDING METHOD FOR PRODUCING COMPOSITE HONEYCOMB CORE STRUCTURES

[75] Inventor: R. John Hilton, Auburn, Wash.

[73] Assignee: The Boeing Company, Seattle, Wash.

[21] Appl. No.: 30,749

[22] Filed: Apr. 17, 1979

Related U.S. Application Data

[60] Continuation-in-part of Ser. No. 9,369, Feb. 5, 1979, abandoned, which is a division of Ser. No. 857,264, Dec. 5, 1977.

[51] Int. Cl.³ .............................................. B32B 3/12
[52] U.S. Cl. ............................ 156/60; 29/156.8 B; 29/156.8 H; 29/156.8 P; 29/156.8 R; 156/182; 156/196; 156/197; 156/242; 244/123; 244/124; 416/226
[58] Field of Search .............. 156/182, 197, 242, 245, 156/293, 60, 196; 29/156.8 B, 156.8 P, 156.8 H, 156.8 R; 244/123, 124; 416/226; 428/118, 295

[56] References Cited

U.S. PATENT DOCUMENTS

| | | |
|---|---|---|
| 3,533,894 | 10/1970 | Engelbrecht et al. ............... 428/118 |
| 3,566,493 | 3/1971 | Poucher et al. ................. 29/156.8 B |
| 3,707,583 | 12/1972 | McKown .............................. 428/118 |
| 3,754,840 | 8/1973 | Zincone .............................. 416/226 |
| 3,782,856 | 1/1974 | Salkinel et al. ....................... 416/226 |
| 3,813,186 | 5/1974 | Palschek et al. ..................... 416/226 |
| 3,883,093 | 5/1975 | Violleau .............................. 244/123 |
| 3,950,115 | 4/1976 | Euler .................................. 244/123 |
| 4,022,546 | 5/1977 | Drees et al. .......................... 416/226 |
| 4,136,846 | 1/1979 | Brault ................................. 244/123 |

Primary Examiner—Caleb Weston
Attorney, Agent, or Firm—Christensen, O'Connor, Johnson Kindness

[57] ABSTRACT

A single stage hot bonding process for manufacturing composite honeycomb core structures, such as airplane control surface structures, capable of withstanding bending and shear stresses, is disclosed. The single stage hot bonding process includes the steps of bonding a low density honeycomb core to a high density honeycomb core, shaping the combined honeycomb core, adhesively attaching spar caps to opposing surfaces of the high density honeycomb core, adhesively attaching a skin to the spar caps and the low density honeycomb core and curing the composite structure in an autoclave. Additionally, if the low density honeycomb core is shaped so that its upper and/or lower surfaces slope toward the opposing surface and join in an edge opposite the high density honeycomb core, such as in the case of airplane control surface structures, the hot bonding process further includes the steps of securing a tab of cured adhesive to the edge of the low density core before the skin is attached, and securing the tab during curing so as to prevent the lateral component of the fluid pressure in the autoclave from causing the lateral movement of the core relative to the skin.

14 Claims, 8 Drawing Figures

SINGLE STAGE HOT BONDING METHOD FOR PRODUCING COMPOSITE HONEYCOMB CORE STRUCTURES

CROSS-REFERENCES TO RELATED APPLICATIONS

This application is a continuation-in-part application of copending U.S. Pat. application Ser. No. 009,369, filed Feb. 5, 1979, abandoned, entitled "Composite Honeycomb Core Structures and Single Stage Hot Bonding Method of Producing Such Structures" which is in turn a divisional application of U.S. Pat. application Ser. No. 857,264, filed Dec. 5, 1977, having the same title.

BACKGROUND OF THE INVENTION

This invention is directed to methods of making honeycomb core structures and, in particular, honeycomb core structures that are subjected to bending and shear stresses, such as aircraft control surface structures.

While the herein described invention was developed for use in the airplane industry by aeronautical engineers and designers, and is described in that environment, it is to be understood that structures formed in accordance with the invention are also useful in other environments. In general, structures formed in accordance with the invention will be useful in many environments requiring bend and/or shear stress resistant panels formed without skin lumps or depressions.

Prior to this invention, solid web, elongated spars were used in many aircraft control surface structures, such as flaps and ailerons to prevent the bending of such structures in a spanwise direction and the shearing of such structures in a chordwise direction. The strength of a solid spar was thought to be required to withstand the bending shear forces applied to such structures during flight. More specifically, during flight, when airplane control surfaces are in their operative positions, both bend and shear stresses are applied to the control surfaces. These stresses are prevented from damaging the control surface structure by a spar mounted spanwise in the structure. The web of the spar resists both shear stress, which concentrates along the chordwise centerline of the control surface structure, and bend stress, which occurs at right angles to the longitudinal axis of the spar. In essence, therefore, the spar forms a primary load carrying member that resists bend and shear stresses. As noted above, because these stresses are high, in the past, it was thought that a solid web spar was required. Obviously, solid web spars are undesirable because they add unnecessary weight to the control surface structures. Added weight, of course, decreases fuel economy as well as increases the power needed to move the control surfaces. However, the additional weight added by solid spars is not their main disadvantage. The main disadvantage of solid spars is that they cannot be inexpensively produced and still meet exact dimensional requirements. Moreover, solid spars often suffer from web warpage. In the past, these disadvantages have been overcome by bolting or rigidly affixing a spar to a "tooling" platform during the formation of airplane control surface structures. The rigid platform was used to maintain the solid spar in a fixed position (attached to the lower skin) during subsequent forming and bonding steps, hereinafter described.

Turning now to a discussion of the necessity for a solid spar to be precisely formed when used as a stengthening member in a honeycomb core structure (or conversely the necessity that the adjacent honeycomb to be formed in a manner that compensates for spar dimensional variations); it is well known that an adhesive layer located between a skin and a honeycomb core will sink into the porous honeycomb core. As a result, the bonding layer will be thinner than the starting adhesive layer, ignoring any adhesive shrinkage. Conversely, an adhesive layer will not sink or decrease in thickness when applied between a skin and a solid surface, such as the flange of a spar, again ignoring adhesive shrinkage and assuming adhesive is not forced or squeezed out between the solid surfaces. Therefore, when a honeycomb core and a spar flange are joined in a planar manner and a skin applied over the core and the flange, aerodynamically harmful rippling or indentations may occur in the skin surface, if the adhesive used is of uniform thickness. This result can be alleviated by forming the portion of the honeycomb core adjacent the spar such that it has a greater thickness than the spar, i.e., the junction between the core and the spar flange is discontinuous. It is known that this discontinuity should fall between 0.00 and 0.01 inch (average 0.005) if a reliable bond without rippling or indentations is to be obtained. In the past, using solid spars, this result has been accomplished using the two stage hot bonding process described below.

In the first stage of a two stage hot bonding process, a lower skin is laid out on the "tooling" platform noted above and an adhesive is applied to the skin surface. The solid spar (usually "C" or I shaped in cross section) is attached to the skin and bolted in place. Next, the honeycomb core is attached to the web of the spar with an adhesive. At the same time the honeycomb core is attached to the lower skin. Flash tape, protective film and bleeder cloth are placed over the core; and, the structure is sealed in a bag mold and placed in an autoclave to cure the adhesive so that bonds are formed. After the bonds are formed, the protective film, bleeder cloth and the flash tape are removed. In the second stage of this process the exposed honeycomb core is machined to a desired shape. At this time the exposed upper surface of the upper flange of the spar is used as an index point to achieve a 0.005 inch average discontinuity between the upper surface of the spar and the region of the honeycomb core adjacent to the spar. (It is pointed out here that this average discontinuity is extremely difficult to achieve in structures having lengths greater than 10 feet.) After the core is cleaned by a vapor degreasing process, the upper skin is adhesively attached to the core and the spar; and the adhesive is cured in an autoclave so that the upper skin becomes bonded to the core and the spar.

Because of the potential cost savings in man-hours, materials and energy, those skilled in the art have been attempting to find a single stage hot bonding process that can be used to produce reliably bonded aircraft control surface structures, such as flaps and ailerons. One attempted solution ignores the tolerance problem created by the nonuniform dimensions of the spar. In this solution, the honeycomb core was machined such that its outer surface adjacent the spars would be 0.04 inch greater than the outer surface of the spars. The flap or aileron was then assembled in a single stage. During assembly, an extra coating of low flow adhesive was applied on the spars by hand to cover up the mismatching created by the nonuniform dimensions of the spars.

Then, the entire assembly was heated in an autoclave to form the adhesive into bond. This attempt to provide a single stage bonding process has a number of disadvantages. Specifically, the use of extra adhesive adds to the weight of the resulting structure. Further, the handwork required to apply the extra adhesive adds manufacturing time and materials and thus increases the cost of the structure. Also, the thick adhesive about the spar area increases the likelihood of leak paths extending to the honeycomb core from the exterior of the structure. Finally, the bond between the skin and the spar, in the area of extra adhesive, has been found to be unreliable.

Therefore, it is an object of this invention to provide new and improved methods for making composite structures suitable for withstanding bending and shear forces.

It is also an object of this invention to provide new and improved methods for making honeycomb core structures suitable for withstanding bending and shear forces.

It is another object of this invention to provide new and improved methods for making aircraft control surface structures, such as flaps and ailerons, that are lighter in weight than similar prior art structures.

It is a further object of this invention to provide composite structures, such as airplane control surface structures, formed by a single stage hot bonding process.

It is yet another object of this invention to provide a new and improved single stage hot bonding process suitable for forming bend and shear stress resistant composite structures, particularly honeycomb core composite structures.

SUMMARY OF THE INVENTION

In accordance with principles of this invention, a single stage hot bonding process is provided for producing composite structures capable of withstanding bend and shear stresses. The composite structures comprise: an elongate primary load carrying member in the form of a high density honeycomb core fitted with spar caps, each having a predetermined thickness, bonded to its upper and lower surfaces; a shape defining low density honeycomb core bonded to the high density honeycomb core and the adjacent edges of the spar caps; and a skin bonded to the spar caps and the low density honeycomb core. The thickness of the low density honeycomb core adjacent to the primary load carrying member is greater than the thickness of the primary load carrying honeycomb core plus the spar caps by a predetermined amount. Composite structures produced by the single stage hot bonding process of the present invention are useful in environments where the structure is to be subject to bend and shear stress, particualrly bend stress in a plane wing transverse to the longitudinal axis of the primary load carrying member. In particular, such composite structures are admirably suited to form the control surface structures (flaps, ailerons, etc.) of airplanes.

The single stage hot bonding process of the invention comprises the steps of: bonding a primary load carrying honeycomb core to a shape defining honeycomb core (or forming both honeycomb cores in a unitary manner); shaping the composite cores to a desired shape with the upper and lower surfaces of the shape defining honeycomb core joining in an edge opposite the primary load carrying honeycomb core; adhesively attaching spar caps to the upper and lower surfaces of the primary load carrying honeycomb core; adhesively attaching skin to the shape defining core and the spar caps and heating the composite structure in a heated bag mold in an autoclave so that the adhesives cure and form bonds. If the shape defining honeycomb core is shaped so that its upper and/or lower surfaces slope toward the opposing surface, then during autoclave curing a lateral component of fluid pressure arises which can cause lateral core collapse. In such cases, the single stage hot bonding process includes, after the step of adhesively attaching spar caps, the step of securing a rigid tab of cured adhesive to the narrowest edge of the shape defining core, and, after the step of adhesively attaching skin, the step of securing the tab so as to prevent the lateral movement of the core relative to the skin.

It will be appreciated from the foregoing brief summary that the invention provides a single stage hot bonding process for making composite honeycomb core structures which include spar caps and a honeycomb core to replace solid spars. Strict, uniform tolerance requirements are easily met by this structure because spar caps can be readily manufactured with a predetermined thickness and because honeycomb cores can be readily machined to precise thicknesses. Although the thickness of each spar cap may vary along its length or width, at any one point the thickness is predetermined and uniform for all spar caps manufactured with the same dimensions. Further, because the thickness of the spar cap is predetermined, the honeycomb core may be shaped before the spar caps are attached. Also, the entire skin (top and bottom) can be added to the spar cap/honeycomb core substructure prior to the substructure adhesive being cured. Because the entire structure is assembled prior to curing the adhesive, only a single curing step is required. Also, an expensive tooling platform is not required. Further, by eliminating the steps surrounding the first curing of the two stage process (i.e., preparing the structure for curing, and leaving after curing) a substantial amount of "man-hours" are saved. Therefore, composite structures formed in accordance with this invention are substantially less expensive to manufacture than are prior art structures formed using a two stage hot bonding process.

BRIEF DESCRIPTION OF THE DRAWINGS

The foregoing objects and many of the attendant advantages of this invention will become more readily apparent as the same becomes better understood by reference to the following detailed description when taken in conjunction with the accompanying drawings wherein.

DESCRIPTION OF THE PREFERRED EMBODIMENTS

FIGS. 1-4 illustrate a composite structure formed in accordance with the method of the present invention in the form of an airplane flap 10. The external configuration of the flap is conventional and includes a leading edge adapted to be attached to a main wing structure and a trailing edge adapted to form the trailing edge of the portion of the wing to which the flap is attached. The flap is a composite structure that comprises an internal substructure and a skin that defines the profile of the flap, which forms one of the control surfaces of an airplane. The invention resides in a single stage process of forming the overall flap, or at least the trailing edge portion thereof. In addition to flaps, the invention can also be used to form other control surface structures, such as ailerons, fixed trailing edge wedges, or other wedge shaped structure.

Figure 1:
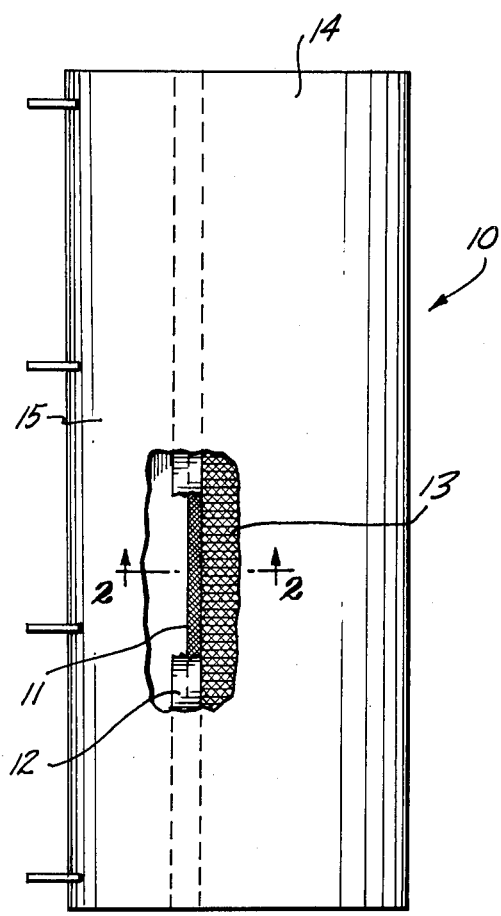
FIG. 1 is a plan view of an airplane flap partially broken away to show the lattice structure of high density and low density honeycomb cores.
Figure 2:
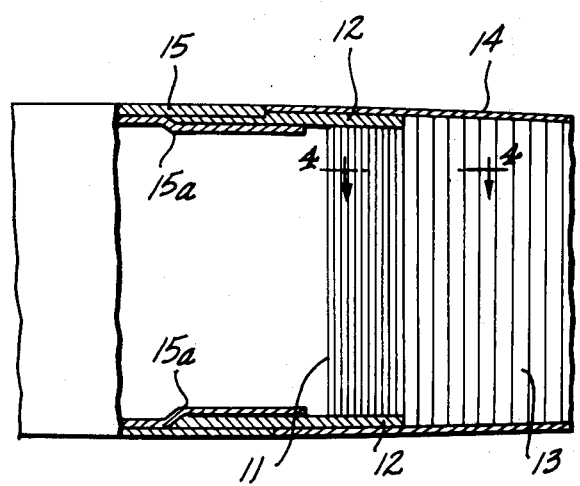
FIG. 2 is a partial cross-sectional view taken along line 2—2 of FIG. 1.
Figure 3:
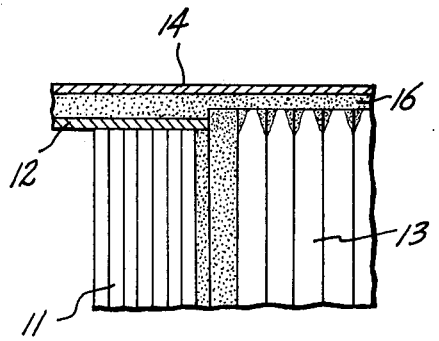
FIG. 3 is an enlarged partial view of FIG. 2 and depicts, in an exaggerated manner, the discontinuity between the outer surface of the low density honeycomb core and the outer surface of the spar cap needed to obtain a resultant composite structure having no surface irregularities in its skin created when a skin is bonded to these surfaces.
Figure 4:
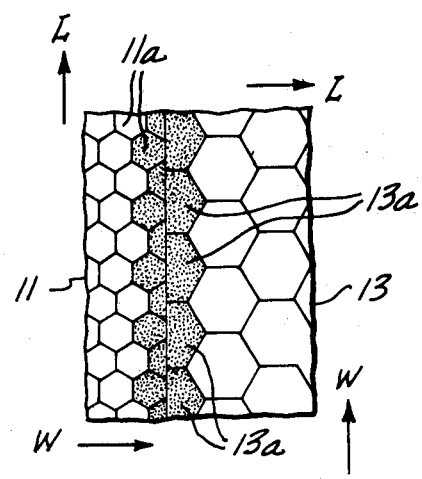
FIG. 4 is a partial enlarged plan view of the lattice-structure taken along lines 4—4 of FIG. 2.

The internal substructure illustrated in FIGS. 1-4 and formed in accordance with the invention comprises an elongate high density honeycomb core 11 extending spanwise across the flap 10 along generally the same longitudinal line as the web of a solid spar of a prior art flap of the same configuration. The high density honeycomb core is a conventional L/W lattice honeycomb core positioned such that the L direction is spanwise, the W direction is chordwise and the open direction is vertical, as best illustrated in FIG. 4. Bonded to the top and bottom of the high density honeycomb core, in the spanwise direction are elongate, flat spar caps 12. The spar caps have a uniform thickness and are attached such that one longitudinal edge of the caps are coplanar with the trailing edge side of the high density honeycomb core. As a result, the high density honeycomb core and the spar caps are C-shaped when viewed in cross section.

The spar caps and the high density honeycomb core form a primary load carrying member adapted to replace the solid web spars used in prior art flaps. If adequately dense, the high density honeycomb core has been found strong enough to remain rigid under abnormal spanwise blending loads and abnormal chordwise shear stresses. Such loads and stresses have been restrained up to over 200% of ultimate design loads. Adequate density ranges for the high density honeycomb core are set forth below.

Bonded to the trailing edge side of the primary load carrying member formed by the composite high density honeycomb core/spar cap element is a shape defining low density honeycomb core 13. The low density honeycomb core also has an L/W lattice; however, in this instance, the L direction is chordwise and the W direction is spanwise. As with the high density honeycomb core, the open direction of the low density honeycomb core is vertical.

A bonding adhesive fills the "open" cells 11a and 13a of the honeycomb cores in the facing plane, as denoted by the speckles in these cells in FIG. 4. The outer, open cell walls of the low density honeycomb core define the outer periphery of the trailing edge portion of the flap 10. More specifically, the open cell surfaces of the low density honeycomb core define the profile of the portion of the flap rearwardly from the primary load carrying member to the trailing edge of the flap, in a manner similar to the low density honeycomb cores used in prior art flaps.

As discussed in the introductory portion of this application, in order to avoid the formation of lumps and depressions, when a skin 14 is added to a substructure comprising contiguous porous (honeycomb) and non-porous (spar cap) regions, it is necessary that a discontinuity exist between these regions. As best illustrated in FIG. 3, this discontinuity is provided by making the low density honeycomb core thicker than the combined thickness of the spar caps and the high density honeycomb core where they join. Then, when an adhesive layer 16 is applied between skin 14 and the internal substructure (spar cap 12 and low density honeycomb core 13), the discontinuity between spar cap 12 and low density honeycomb core 13 compensates for the unavoidable sinking of adhesive 16 into the porous honeycomb core. While the discontinuity dimension between the outer surfaces of the spar caps and the low density honeycomb core can vary depending upon the size of the cells of the honeycomb core and the properties of the adhesive, for an airplane flap useful on a modern commercial jet (such as the 727 sold by The Boeing Company, Seattle, Washington) an average dimension of 0.005 inch is suitable. More specifically, the discontinuity between the bottom spar cap and the lower surface of the low density honeycomb core and the top spar cap and the upper surface of the low density honeycomb core can vary between 0.00 inch and 0.01 inch as long as the average is approximately 0.005 inch. The present invention, thus, does not eliminate the discontinuity. Rather, the invention provides a primary load carrying member having a honeycomb core web that replaces the solid web spars used in prior art flaps.

There are several advantages to using a primary load carrying member formed of a high density honeycomb core and pair of spar caps in place of a solid web spar. First, the primary load carrying member can be inexpensively formed to exacting dimensional requirements, i.e., such members can be held within strict tolerance limits without becoming unduly expensive. Contrariwise, it is difficult for solid spars to meet the same requirements and, even if solid spars can be formed to the required dimensions, the cost of forming such spars is prohibitive. Second, because the primary load carrying member is precisely sized, the overall composite structure (e.g., flap) can be formed by a single stage hot bonding process described in detail below, for a substantial saving in production costs. Thirdly, depending on the size (width) and density of the high density honeycomb core a weight reduction can be achieved while adequate strength is retained.

The single stage hot bonding process of the invention used to form the above described composite structures generally involves assembling the primary load carrying member, the skin supporting honeycomb core and the skin; and, heating the assembly in an oven. Prior to assembly, the honeycomb core or cores are shaped by machining their outer surfaces with a router having a valve stem cutter blade, for example. Because the spar caps have a uniform, predetermined thickness, the discontinuity between the adjacent surfaces of the primary load carrying member and the low density (skin supporting) honeycomb core can be formed with precision to insure that correct spacing between these surfaces is strictly maintained. Assuming that the composite structure is to be a flap, the shaping step includes machining the low density honeycomb core to the desired aerodynamic contour. The lower skin (of the flap) is then laid out on a tooling surface and adhesive is applied to the exposed side of the skin. The lower spar cap is positioned and placed on the skin in the appropriate position. Next, the portion of the exposed surface of the lower spar cap that will contact the high density honeycomb core is coated with an adhesive. The previously bonded primary load carrying member honeycomb core and the low density honeycomb core is placed on the lower skin and the lower spar cap. The upper spar cap is then attached to the primary load carrying member honeycomb core with an adhesive; and, the upper skin is attached to the exposed surface of the low density honeycomb core and the upper spar cap with an adhesive. The assembled flap structure is then sealed in a bag mold and the adhesive is cured in a heated autoclave. When a moderate heat curing modified epoxy is used as the adhesive, the autoclave temperature is preferably about 250° F.

Figure 5:
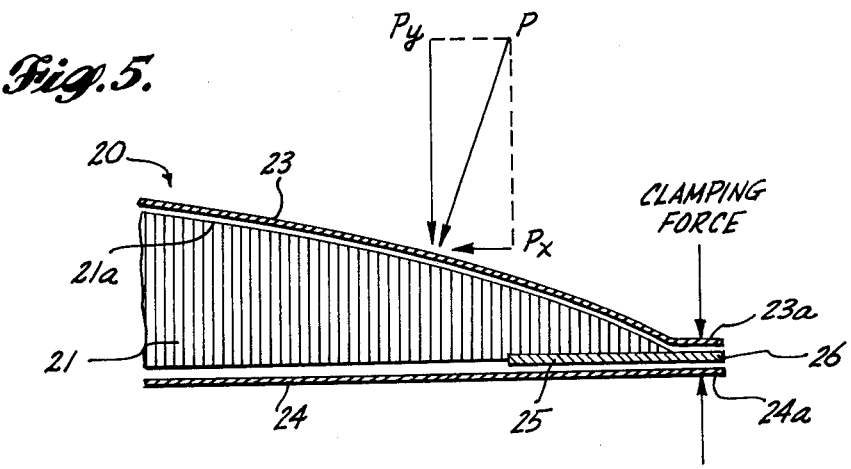
FIG. 5 is a cross-sectional view of the trailing edge portion of a control surface structure including an adhesive tab extending beyond the trailing edge thereof.

The above described steps comprise a single stage hot bonding method for producing all types of composite core structures including those for airplane control surface structures. However, in the case of airplane control surface structures, if the shape defining honeycomb core is of sufficiently low density and/or the aerodynamically contoured surface of the core is sufficiently sloped, the lateral component of fluid pressure on the aerodynamically contoured surface can occasionally result in lateral core collapse. The mechanism for such lateral core collapse can be best understood with reference to FIG. 5, which shows a trailing edge portion 20 of an airplane flap including a shape defining low density honeycomb core 21, with an aerodynamically contoured upper surface 21a, disposed between an upper skin 24 and a lower skin 23. As is known by those skilled in the art, during curing an autoclave is pressurized to apply fluid pressure to those surfaces of the structure which are to be adhered to insure that contact is maintained between the adherents and the bonding medium. For the airplane flap in FIG. 5, this fluid pressure is represented by a pressure vector P orthogonal to the aerodynamically sloping surface of upper skin 24 and, therefore, to the sloping surface of low density honeycomb core 21. Pressure vector P translates into a component of pressure $P_y$ directed parallel to the cells of the honeycomb core 21, and a lateral component of pressure $P_x$ directed perpendicular to the core cells. The lateral component of pressure $P_x$ has no undesired direct affect on the contoured skin 23. More specifically, the skin is rigid and generally secured to a tooling platform; also, the bag mold is usually taped to the tooling platform, giving further lateral support to the skin 23. The component of pressure $P_y$, however, tends to force the skins 23 and 24 together, with the result that the lateral component of pressure $P_x$ is transmitted to the underlying contoured surface 21a of the low density honeycomb core 21. This lateral component $P_x$ appears all along the contoured surface 21a and, depending upon the degree of slope, can represent a significant lateral force on the low density core 21. The adhesive between the contoured skin 23 and the core surface 21a, being extremely fluid when initially heated, does not provide any countervailing support, acting instead more like a lubricant. Thus, if the low density core 21 is of sufficiently low density, the lateral component of pressure $P_x$ thereon will tend to laterally collapse the low density core unless the core is in some manner secured to prevent its lateral movement relative to the skins 23 and 24.

As discussed in the background portion of the specification, in the two stage hot bonding process the solid web spar and the low density honeycomb core are adhered to the lower skin of the flap and cured in an autoclave prior to machining the low density honeycomb core to an aerodynamic contour. Thus, the low density core is securely bonded to the lower skin during the second autoclave curing stage which prevents core collapse due to a lateral component of pressure on the contoured surface of the flap by preventing the lateral movement of the low density core relative to the skins. Although any suitable means may be utilized to secure the contoured low density honeycomb core 21 during the single stage hot bonding process, a preferred method involves securing a tab of cured adhesive to the lower surface of the trailing edge of the low density core and then securing the tab to other elements, such as skin extensions, or a tooling platform during the bonding process, whereby the low density core is secured, relative to the upper and lower skins of the control surface structure during bonding.

Figure 6:
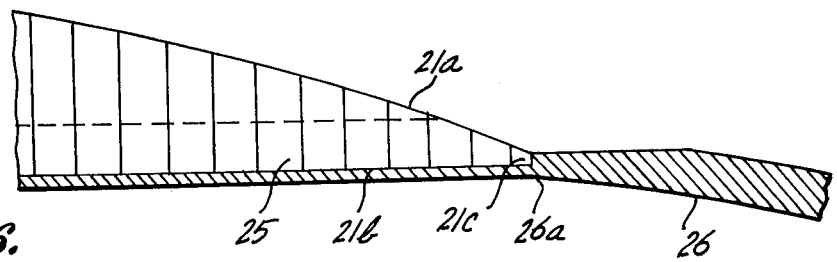
FIG. 6 is an enlarged cross-sectional view of the trailing edge portion of the low density core for a control surface structure including an adhesive tab.

One method of forming such an adhesive tab is as follows. FIG. 6 provides an enlarged view of the trailing edge portion of the low density honeycomb core 21 having a planar lower surface 21b intersecting the contoured upper surface 21a to form a trailing edge 21c that is typically a few thousandths of an inch thick. In order to machine honeycomb cores to such a sharp edge without fraying the edge, it is necessary to form a strip of cured adhesive at the trailing edge portion of the core. Thus, prior to machining the low density honeycomb core 21 a strip of adhesive 25 is applied to the trailing edge portion of the lower surface 21b and cured. The adhesive strip 25 extends below lower surface 21b by approximately two thousandths of an inch and fills the adjoining cells of the honeycomb core 21 to the approximate depth of 10 thousandths of an inch. The adhesive tab 26 used during curing to prevent the lateral collapse of the core is formed by extending the adhesive strip 25 beyond the edge of the low density honeycomb core 21. The machining action used to form the sharp trailing edge 21c in the low density honeycomb core is performed in a manner that allows the adhesive tab 26 to remain secured to the adhesive strip 25 and, thereby, to the low density core 21. This result is achieved by machine grinding down low density core 21 to the adhesive strip 25 when the trailing edge 21 is formed and then deburring the remaining portion of the contoured surface 21a to form the ultimate shape of the trailing edge portion of the core without separating the adhesive tab from the adhesive layer. Alternatively, the adhesive tab can be deflected slightly downward (as shown in FIG. 6) prior to a single step router cutting operation.

The upper and lower skins of a flap are typically configured to extend beyond the trailing edge of the flap, with the trailing edge being formed after autoclaving by machining off the excess portions of the upper and lower skins and then bonding them together. Thus, for the trailing edge portion shown in FIG. 5, upper and lower skins 23 and 24 include respective portions 23a and 24a which extend back beyond the trailing edge of low density honeycomb core 21. Interposed between the extended skin portions 23a and 24a is the adhesive tab 26. To secure the adhesive tab 26, and thereby the low density honeycomb core 21 relative to the upper and lower skins 23 and 24, the adhesive tab 26 may be clamped between the skin portions 23a and 24a. The secured tab 26 then counteracts the lateral component of pressure $P_x$, preventing the collapsing movement of the low density core 21 relative to the upper and lower skins 23 and 24. Alternatively, the tab can be secured to a fixed surface such as the tooling platform supporting the flap. After the curing process, the skin portions 23a and 24a and adhesive tab 26 are machined off, and the upper and lower skins bonded together to complete the trailing edge of the flap.

The assembly steps of the foregoing process are meant to be construed as exemplary, not limiting, since they can be varied. For example, the honeycomb cores may be individually machined to their desired shapes, with the adhesive tab being attached to the low density (skin supporting) honeycomb core, the two spar caps attached to the primary load carrying member honeycomb core with adhesive, the skin supporting honeycomb core attached to the primary load carrying member honeycomb core and the spar caps with adhesive and, then, the skins attached and the adhesive tab secured. This alternative series of assembly steps eliminates the need to bond the honeycomb cores together prior to curing the adhesives of the entire assembly.

Referring again to FIGS. 1-4, after the one step hot bonding process the flap 10 is completed by a leading edge or nose structure 15 that is attached to the forwardly projecting portions of the spar caps 12. Since the thickness of the material used to form the nose is usually thicker than the skin 14, the forwardly projecting portions of the spar caps are illustrated as undercut. As a result, a flush joint is created on the outer surface of the flap. Further, for reinforcement purposes, plates 15a are illustrated as located on the inner side of the flap so as to overlie the forward edge of the spar caps and the adjacent surfaces of the spar caps and the nose structure 15. Preferably, the nose structure is attached by rivets, even though other attachment devices can be used, as desired.

Figure 7:
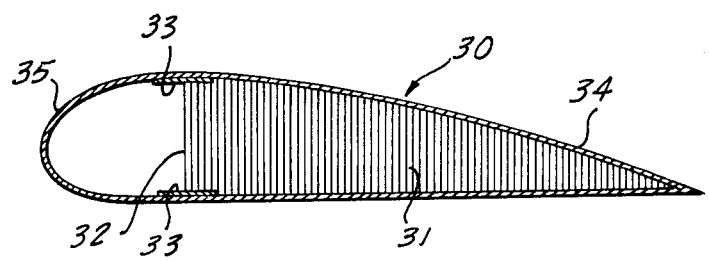
FIG. 7 is a cross-sectional view of an aileron.

The one step hot bonding process of the present invention is fully compatible with composite core structures besides those having a high density primary honeycomb core bonded to a low density shape defining honeycomb core. For example, in some environments, a composite structure may be adequately strong if the honeycomb core of the primary load carrying member has a density (low) similar to the density of the skin supporting honeycomb core. In such a case, the honeycomb core of the primary load carrying member and the honeycomb core supporting the skin can be formed in a unitary manner and machined to the correct configuration prior to assembling the composite structure by the one step hot bonding process. Alternatively, if the skin supporting honeycomb core needs to be more dense to provide additional strength, a unitary high density honeycomb core can be machined to form both the skin core and the primary load carrying member core. (In the case of a unitary high density honeycomb core, the core may be adequately strong to resist lateral core collapse during autoclaving without being separately secured.) An example of a composite structure (aileron) wherein both honeycomb cores have the same density and are formed in a unitary manner is illustrated in FIG. 7. More specifically, FIG. 7 is a cross-sectional view of an aileron 30 having a unitary honeycomb core 31. The unitary honeycomb core 31 is machined or formed so as to have a trailing edge region in the shape of the trailing edge portion of the aileron 30; and, a leading edge region 32 that faces the leading edge of the aileron, but is spaced therefrom. The leading edge region 32 is undercut on its upper and lower surfaces by an amount adequate to provide the heretofore discussed discontinuity after top and bottom spar caps 33 are bonded to the undercut areas. The spar caps project outwardly from the leading edge region 32 of the honeycomb core 31. As with the composite structure (flap) illustrated in FIGS. 1-4 and heretofore described, a skin 34 is bonded to the spar caps and the trailing edge region of the unitary honeycomb core. After assembling the composite structure by the one step hot bonding process, a U-shaped leading edge 35 is riveted to the forwardly projecting portion of the spar caps 33.

Figure 8:
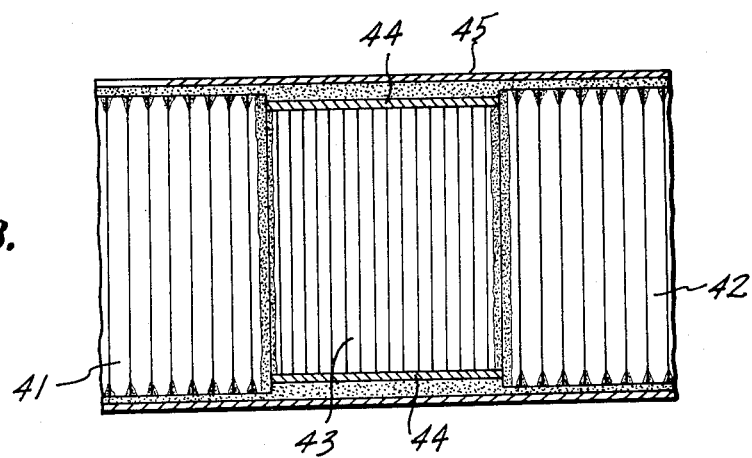
FIG. 8 is a cross-sectional view of a composite structure containing two low density honeycomb cores bonded to a high density honeycomb core exaggerated to better illustrate the discontinuity between the outer surfaces of the low density honeycomb core and the outer surfaces of the spar caps and the differential in adhesive thickness.

In some composite structures, it may be necessary for a skin supporting honeycomb core to extend outwardly from opposing sides of the honeycomb core of the primary load carrying member. Such structures may be airplane control surface structures, light weight panels, etc. FIG. 8 is a cross-sectional view illustrating a panel embodiment of the invention wherein skin supporting low density honeycomb cores 41 and 42 extend outwardly from an elongate high density honeycomb core 43 to which the low density cores are bonded. Bonded to the high density honeycomb core 43 are top and bottom spar caps 44. Again, the combined height of the high density honeycomb core and the spar caps (which form a primary load carrying member) is slightly less (shown exaggerated in FIG. 8) than the height of the adjacent regions of the low density honeycomb cores 41 and 42. Bonded to the spar caps and the exposed adjacent surfaces of the low density honeycomb cores 41 and 42 is a skin 45. It is pointed out that in this embodiment of the invention the high density honeycomb core width and the width of the spar caps 44 is the same. Thus, the spar caps do not extend beyond one side of the high density honeycomb core, as in previously described embodiments of the invention. In this regard, if necessary or desired, the honeycomb cores of the primary load carrying members of the previously described embodiment of the invention can also fill the entire region between the spar caps. Further, while the embodiment of the invention illustrated in FIG. 8 and heretofore described includes a high density honeycomb core as part of the primary load carrying member, as with the previously described embodiments of the invention, the density of the skin supporting and primary load carrying honeycomb cores can be the same, either high or low. Further, if the same density, the honeycomb cores can be formed in a unitary manner. The single stage hot bonding process of the present invention is fully compatible with these composite structures.

The honeycomb cores, spar caps and skins may be formed of various materials, such as aluminum, aluminum alloy, titanium, titanium alloy, steel, steel alloys, glass, fiberglass or other fiber reinforced synthetic resins, paper products or high temperature nylons such as polyamides (marketed under the trade name "Nomex")

depending upon how the resulting composite structure is to be used. The adhesives used for bonding may be epoxies, acrylic polymers, phenolics or any nonvolatile adhesive adequate to provide the necessary bond strength.

As known by those skilled in the art, standard aluminum alloy L/W honeycomb core is catagorized by its density. As used herein, low density honeycomb core in this context has a density between 2.1 and 4.5 pounds per cubic foot; and, high density honeycomb core has a density between 7.1 and 55 pounds per cubic foot.

By way of example, an actual inboard flap for an airplane (Boeing 727) formed in accordance with the single stage hot bonding process of the invention using standard aluminum aircraft alloys included a primary load carrying member having a high density honeycomb core with a density of 12 pounds per foot and formed 2/16 inch cells having a wall thickness of 0.003 inches, a width of 0.75 inches, a height of approximately 2.5 inches and a length of approximately 15 feet. The skin supporting low density honeycomb core had a density of 3.1 lbs/ft$^3$ and was formed of 3/16 inch cells having a wall thickness of 0.001 inches, a height of approximately 2.5 inches at the interface between the high and low density honeycomb cores, a width of approximately 14.8 inches and a length of approximately 15 feet. The spar caps were 0.10 inch thick, 2.0 inches wide and approximately 15 feet long; and the upper skin was 0.012 inches thick and the lower skin was 0.016 inches thick. The adhesive used was a moderate heat curing modified epoxy; the modified epoxy is obtainable from American Cyanide as modified epoxy FM-73, or from Hysol Corporation epoxy number 9628. Adhesive thickness between the skin and the spar caps, between the skin and the low density honeycomb core, and between the spar caps and high density honeycomb core was 0.01 inch. Adhesive thickness between the high and low density honeycomb cores was 0.05 inch.

In some instances it may be preferably to vary the density within either of the cores, depending on the strength that is needed. For example, in flaps used in the Boeing 737 airplane the density of the core of the primary load carrying member is about 12 pounds per cubic foot. This density increases to 21 pounds per cubic foot where actuators are affixed to the primary load carrying member.

While a preferred embodiment of a single stage hot bonding process for making composite structures wherein a honeycomb core replaces the web of a solid spar have been described, it will be appreciated by those skilled in the art that various changes can be made therein without departing from the spirit and scope of the invention. For example, many of the assembly steps of the single stage hot bonding process are interchangeable. Thus, these steps may be performed in various sequences. And, as noted previously, if the shape defining honeycomb core is sufficiently dense to resist lateral core collapse in the autoclave, the steps of applying and securing an adhesive tab can be eliminated. Further composite structures other than flaps and ailerons can be formed. Depending upon various strength requirements and the type of structures to be attached, the spar caps may vary in thickness. However, the thickness of each spar cap at any one point must be known and uniform for all spar caps having the same shape, and the discontinuities between the outer surface of the spar caps and the outer surface of the low density honeycomb core adjacent to the spar cap must be maintained.

Hence, the invention can be practiced otherwise than as specifically described herein.

The embodiments of the invention in which an exclusive property or privilege is claimed are defined as follows:

1. A single stage hot bonding process for forming composite honeycomb core structures comprising the steps of:
   bonding a primary load carrying honeycomb core to an edge of a shape defining honeycomb core to form a combined honeycomb core;
   forming opposed undercut regions in said combined honeycomb core in the region of said primary load carrying honeycomb core by reducing the thickness of said primary load carrying honeycomb core to less than the thickness of said shape defining honeycomb core;
   placing a first skin on a working surface;
   applying adhesive to the exposed side of said first skin;
   attaching a first spar cap to said first skin;
   applying adhesive to the exposed side of said first spar cap;
   attaching said combined honeycomb core to said first spar cap and said first skin such that one of said opposed undercut regions of said combined honeycomb core overlies and is attached to said first spar cap and the surface of said shape defining honeycomb core portion of said combined honeycomb core adjacent to said undercut region overlies and is attached to said first skin;
   applying adhesive to the exposed side of said combined honeycomb core;
   attaching a second spar cap to the other one of said opposed undercut regions of said combined honeycomb core;
   applying adhesive to the exposed side of said second spar cap;
   attaching a second skin to said second spar cap and said exposed side of said combined honeycomb core; and,
   simultaneously heating said attached combined honeycomb core, said first and second spar caps and said first and second skins to cure said adhesives and simultaneously form bonds between said combined honeycomb core, said first and second spar caps and said first and second skins where they join.

2. The single stage hot bonding process set forth in claim 1 including the step of shaping said shape defining honeycomb core to a desired contour with the thickness of said shape defining honeycomb core tapering gradually away from said primary load carrying honeycomb core and terminating in a trailing edge.

3. The single stage hot bonding process set forth in claim 2 wherein the step of simultaneously heating said attached combined honeycomb core, said first and second spar caps and said first and second skins occurs in a pressurized autoclave.

4. The single stage hot bonding process set forth in claim 3 further comprising:
   before the step of shaping said shape defining honeycomb core to a desired contour, the steps of applying adhesive to the region of said shape defining honeycomb core that will ultimately form said trailing edge of said shape defining honeycomb core and curing said adhesive;

shaping said cured adhesive applied to the region of said shape defining honeycomb core that will ultimately form said trailing edge of said shape defining honeycomb core into an adhesive tab extending outwardly from the trailing edge of said shape defining honeycomb core during said step of shaping said shape defining honeycomb core to a desired contour; and, securing said adhesive tab to said working surface and, thereby, said shape defining honeycomb core to said working surface to prevent the lateral movement of said shape defining honeycomb core relative to said first and second skins when said attached combined honeycomb core, said first and second spar caps and said first and second skins are heated in said pressurized autoclave.

5. The single stage hot bonding process set forth in claim 1 wherein the step of simultaneously heating said attached combined honeycomb core, said first and second spar caps and said first and second skins occurs in an autoclave.

6. The single stage hot bonding process claimed in claim 5 wherein said autoclave is pressurized during said simultaneous heating step.

7. The single stage hot bonding process set forth in claim 6 further comprising the steps of:

applying adhesive to the region of said shape defining honeycomb core remote from said primary load carrying honeycomb core and curing said adhesive;

shaping said cured adhesive applied to the region of said shape defining honeycomb core remote from said load carrying honeycomb core into an adhesive tab extending outwardly from said shape defining honeycomb core; and, securing said adhesive tab with respect to said shape defining honeycomb core to prevent the lateral movement of said shape defining honeycomb core relative to said first and second skins when said attached combined honeycomb core, said first and second spar caps and said first and second skins are heated in said pressurized autoclave.

8. A single stage hot bonding process for forming composite honeycomb core structures comprising the steps of:

forming opposed elongate undercut regions in a combined honeycomb core that comprises a primary load carrying honeycomb core and a shape defining honeycomb core, said opposed elongate undercut regions being aligned with said primary load carrying honeycomb core;

adhesively attaching first and second spar caps to the outer surfaces of said primary load carrying member so as to fill said opposed elongate undercut regions;

adhesively attaching a skin to the outer surfaces of said spar caps and said shape defining honeycomb core; and, simultaneously heating said combined honeycomb core, said first and second spar caps and said skin to cure said adhesives and simultaneously form bonds between said combined honeycomb core, said first and second spar caps and said skin.

9. The single stage hot bonding process set forth in claim 8 wherein said combined honeycomb core, said first and second spar caps and said skin are heated in an autoclave to simultaneously cure said adhesives and bond said combined honeycomb core, said first and second spar caps and said skin together.

10. The single stage hot bonding process set forth in claim 8 including the step of shaping said shape defining honeycomb core to a desired contour with the thickness of said shape defining honeycomb core tapering gradually away from said primary load carrying honeycomb core and terminating in a trailing edge.

11. The single stage hot bonding process set forth in claim 10 wherein said combined honeycomb core, said first and second spar caps and said skin are heated in a pressurized autoclave to simultaneously cure said adhesives and bond said combined honeycomb core, said first and second spar caps and said skin together.

12. The single stage hot bonding process set forth in claim 11 further comprising:

before the step of shaping said shape defining honeycomb core, the steps of applying adhesive to the region of said shape defining honeycomb core that will ultimately form said trailing edge of said shape defining honeycomb core and curing said adhesive;

shaping said shape defining honeycomb core such that an adhesive tab projects outwardly from said trailing edge of said shape defining honeycomb core; and, securing said adhesive tab with respect to said shape defining honeycomb core and, thereby, said shape defining honeycomb core to prevent the lateral movement of said shape defining honeycomb core relative to said skin when said combined honeycomb core, said first and second spar caps and said skin are heated in said pressurized autoclave.

13. The single stage hot bonding process claimed in claim 9 wherein said autoclave is pressurized during said heating step.

14. The single stage hot bonding process set forth in claim 13 further comprising the steps of:

applying adhesive to the outer edge of said shape defining honeycomb core and curing said adhesive;

shaping said cured adhesive applied to the outer edge of said shape defining honeycomb core such that an adhesive tab projects outwardly from said shape defining honeycomb core; and, securing said adhesive tab with respect to said shape defining honeycomb core to prevent the lateral movement of said shape defining honeycomb core relative to said skin.

* * * * *